March 7, 1967  A. STRICKLER  3,308,041

METHOD AND APPARATUS FOR TITRATION

Filed Dec. 5, 1961

INVENTOR
ALLEN STRICKLER
BY
*Robert M. Taylor, Jr.*
ATTORNEY

United States Patent Office 3,308,041
Patented Mar. 7, 1967

3,308,041
METHOD AND APPARATUS FOR TITRATION
Allen Strickler, Fullerton, Calif., assignor to Beckman Instruments, Inc., a corporation of California
Filed Dec. 5, 1961, Ser. No. 157,130
20 Claims. (Cl. 204—1)

This invention relates to titrating apparatus and a method of titration and more particularly relates to an automatic and continuous titration apparatus and method.

The need for a continuous and automatic titrating apparatus has long been recognized in those industries where it is desirable to continuously monitor the condition of a flowing stream. As an example, in the chemical, petroleum, plastics, and food processing industries it is often essential that the titratable acid or alkali content of a process stream be maintained within certain specified limits. It is, therefore, necessary that in such applications any change in condition be immediately indicated in order that deviations beyond the limits may be promptly corrected. The critical nature of these processes makes inapposite the periodic sampling and titrating of these streams and calls for a continuous and automatic titrating apparatus.

Several such continuous and automatic titrating systems have been proposed in the past in an attempt to solve this problem. In one such solution, it has been proposed to divert a small portion of the stream through a treating zone in which are located a first and second pair of electrodes. The upstream electrodes are supplied with a current which causes the generation of a reagent which reacts with the sample solution. The downstream pair of electrodes are sensing electrodes and give an indication of the pH of the treated solution. By comparing the output of the sensing electrodes with a preselected reference signal representing equivalence between reagent and sample, an error signal is obtained which may be used to control the flow of current between the two generating electrodes. Since the current passing between the electrodes is proportional to the rate of generation of titrant, the unknown characteristic of the sample can be continuously observed.

While the above described apparatus is satisfactory in some applications, it has a number of limitations which severely restrict its use. In this type apparatus, the presence of the generating electrodes in the sample solution often causes electrolytic reactions other than that which generates the titrant, resulting in erroneous or unreliable output readings. The electrodes may also become fouled or poisoned by various sample constituents or suspended matter. It is also very difficult to electrically isolate the generating electrodes from the sensing electrodes with the result that interaction between them may occur and adversely affect the normal feedback behavior of the system.

According to the present invention, it has now been found that a system can be provided for coulometrically generating a titrant externally of the sample stream with the result that the above mentioned disadvantages are overcome. In the present system, titrant is provided by passing a current through an electrolyte in a generating cell remote from the sample stream. The generated titrant is mixed continuously with the sample stream and passed over a pair of sensing electrodes which measure a condition of the mixture which varies as a function of the ratio of titrant to sample. Apparatus is provided for directing the flow of the sample and the titrant to the mixing means and the resulting mixture to the sensing electrodes so that the generating electrodes and the sensing electrodes are electrically isolated. The output of the sensing electrodes is fed to a controller which varies the current in the generator and thereby the titrant output as a function of the measured condition of the mixture to maintain a particular condition such as chemical equivalence or neutrality at the measuring means. A suitable meter or recorder is provided in the generating circuit to indicate the current flowing in this circuit and thus the rate of generation of titrant, the latter being an indication of the strength of titer of the sample stream.

It is therefore a primary object of the present invention to provide apparatus for continuously titrating a sample stream in which the titrant is coulometrically generated externally of the sample stream.

It is also an object of the present invention to provide a continuous coulometric titrator which requires only small volumes of sample and titrant in its operation.

It is another object of the present invention to provide a coulometric titrator in which the generating electrodes and the sensing electrodes are electrically isolated.

It is a further object of the present invention to provide a control system for a continuous coulometric titrator.

It is a still further object of the invention to provide a control system for a coulometric titrator having an exponential transfer function.

These and further objects and advantages of the invention will become more apparent upon reference to the following specification and claims and appended drawings wherein:

Figure 1:
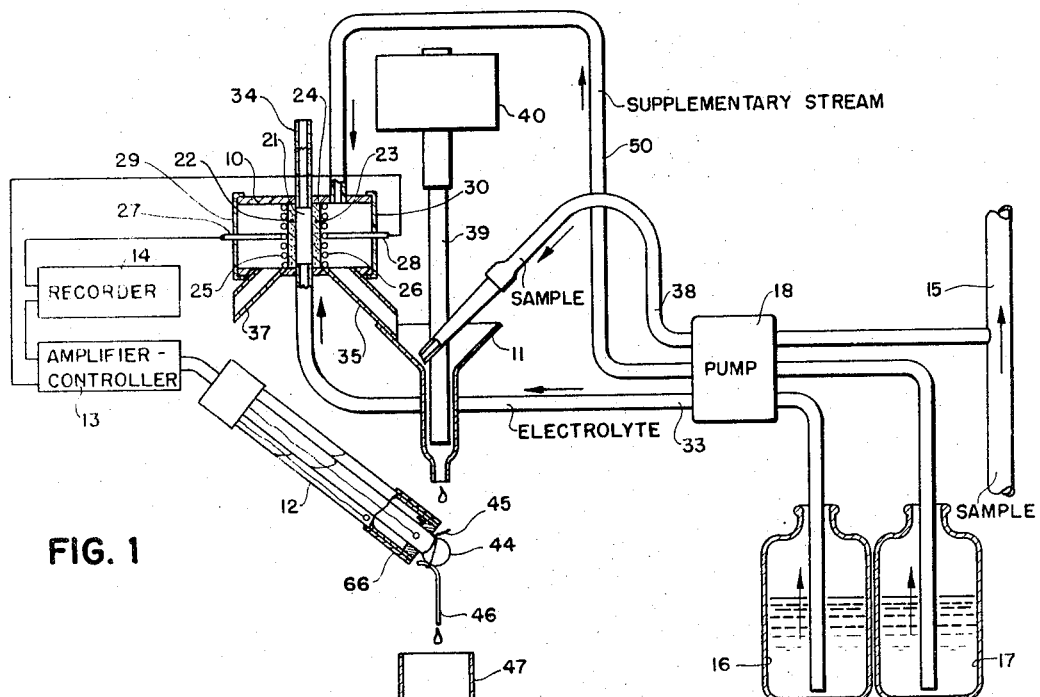
FIG. 1 illustrates a preferred embodiment of the invention.

The apparatus of FIG. 1 includes a coulometric reagent generator 10, a mixing funnel 11, an electrometric measuring electrode 12, an amplifier-controller 13, a recorder 14, a process stream 15, a container of electrolyte 16, a container of supplementary liquid 17, and a pump 18.

Various types of coulometric reagent generators may be used to externally generate titrant in accordance with the teachings of the present invention. A preferred form of generator, however, is of the type shown in my U.S. Patent No. 3,244,608, issued April 5, 1966, entitled Coulometric Reagent Generator and assigned to the assignee of the present application. When properly designed and operated, this generator produces reagent with 100% coulometric efficiency, i.e., it produces one chemical equivalent of reagent for each Faraday (96,493 coulombs) of electrical charge traversing the generator, in accordance with Faraday's law.

In the generator 10 as shown in FIG. 1, a supply of suitable electrolyte 21 is maintained between a pair of porous discs 22 and 23 in a tubular housing 24. A coiled wire electrode 26, usually of an inert or noble metal such as platinum, is positioned against the disc 23 and is connected to the amplifier-controller 13 by a conductor 28 which is mechanically supported by cap 30. Another similar coiled wire electrode 25 is positioned against the disc 22 and is connected to the recorder 14 by a conductor 27 which is mechanically supported by cap 29. The recorder is coupled to the amplifier controller 13 by a conductor 27'. The electrolyte 21 is pumped to the generator from the container 16 by the pump 18 through a line 33, and a line 34 is coupled to the housing 24 to function as a standpipe permitting easy escape of air from between the porous discs on start-up of the apparatus.

After the electrolyte 21 has been introduced into the housing 24, it slowly diffuses through the porous discs 22 and 23 and forms a liquid film on the electrodes 25 and 26. A current passing between the electrodes 25 and 26 results in a useful reagent substance being produced at one of the electrodes, the quantity of such substance generated in a unit of time being proportional to the magnitude of the current. Thus the useful reagent may be generated at the electrode 26 and flow through a line 35 to the mixing funnel 11. Any gases generated at the electrode 26 will also pass out through line 35, however, this line should be of sufficient cross-section to avoid filling or bridging of the bore by entrained gas bubbles. Such substances as may be generated at the electrode 25 ordinarily flow through line 37 to waste via a discharge conduit (not shown). As was the case with line 35, the line 37 should be of sufficient cross-section to easily pass any gas generated at electrode 25.

As a typical example, the electrolyte may be 1 molar sodium sulfate, in which case electrolytic action results in the production of hydrogen ion and oxygen at the electrode 25 and hydroxyl ion and hydrogen at the electrode 26 when the electrode 25 is positive with respect to the electrode 26.

A stream of sample may be delivered at a suitable volume rate to the mixing funnel 11 from the process stream 15 or other suitable source by a pump 18 and the line 38. The sample and the coulometrically generated titrant are thoroughly mixed by suitable means, such as a rod 39 driven by a motor 40 and extending into the funnel 11. The sample-titrant mixture then flows from the mixing funnel 11 to the measuring electrode 12.

In the embodiment illustrated in FIG. 1, the measuring electrode 12 is a conventional combination glass plus reference electrode for measurement of pH. The glass electrode is centrally positioned under the outlet of the funnel 11 with an exposed bulb 44 serving as the sensitive surface. The reference electrode is concentric with and surrounds the glass electrode and the liquid junction is provided by a thread 45. This type of electrode is well known to those skilled in the art and further explanation thus appears unnecessary.

The apparatus is preferably adjusted so that the flow of the sample-titrant mixture from the mixing funnel 11 to the electrode 12 occurs in discrete drops, each drop being of a magnitude sufficient to substantially cover the sensitive surface of the bulb 44. The arrival of each new drop of mixture from the funnel 11 largely displaces the preceding drop and, if desired, means may be provided causing the rapid drainage of a hanging drop from the bulb 44 to further reduce liquid holdup on the electrode. For example, a strip 46 of highly wettable material may be attached to the bulb by a loop of thread or wire. A basin 47 discharging to waste may be provided for catching the mixture. A typical highly wettable material suitable for use in this system is porous polyvinyl chloride.

The electrode 12 is connected to the amplifier-controller 13 which has an output current varying as a function of the departure of the electrode signal from a predetermined value characteristic of the endpoint. In a typical example, the apparatus may be used to measure the concentration of a stream of hydrochloric acid by titrating with hydroxyl ion, the titrant previously identified. The titration endpoint may be the neutral condition of pH 7, the current through the electrolyte being continuously varied as required to generate titrant at an appropriate rate for continuously maintaining the titrant-sample mixture at or near pH 7.

If the coulometric generation of hydroxyl ion proceeds at 100% efficiency, then the current passing between the electrodes of the generator is an absolute measure of the rate of production of hydroxyl ion, and consequently of the instantaneous concentration of hydrochloric acid. Recording of this current therefore provides a constant and accurate measure of sample concentration.

It has been found that the performance of the apparatus may be improved and greater flexibility of the system achieved by use of a stream of supplementary liquid for mixing with the titrant. The supplementary liquid should be a material which does not affect adversely the electrolysis or the condition of the sample being measured, and ordinarily pure water or the same electrolyte as is fed to the interior of the generator cell is found most suitable. The supplementary liquid is delivered from a source such as the container 17 through a line 50 to the right hand compartment of the generator 10, adjacent the electrode 26. The stream of supplementary liquid accelerates the transfer of titrant from the generator to the mixer. It also is useful in purging gas bubbles from the disk 23 and line 35, hence helping to smooth the flow of titrant from the generator to the mixer. The decreased transport time for the titrant improves the over-all system response and the more uniform rate of flow minimizes the noise appearing in the titration record.

The apparatus disclosed in FIG. 1 provides for generation of the titrant at a point removed from the sample stream and the measuring system, and for mixing of titrant and sample at a point remote from the titrant and sample sources. It is also desirable to provide electrical isolation between the titrant generator and the measuring system for reasons previously mentioned. This may be done with respect to D.C. isolation by the inclusion of a transformer isolation stage in the system. For example, transformer 63 in FIG. 2, if made with high insulation between windings, may serve this purpose. In the preferred control system, however, it is also desirable to effect A.C. isolation.

Both D.C. and A.C. isolation are achieved in the apparatus of FIG. 1 by flowing the mixture from the funnel 11 to the electrode 12 in discrete drops with the intervening air providing high electrical resistance between the electrode and the generator. This electrical isolation eliminates effectively the feedback of D.C. and A.C. signals from the generator electrode to the measuring electrode which tend to mask or swamp out the small signal normally produced by the sensing electrodes. In an alternative form, the isolation could be provided between the generator 10 and the mixing funnel 11 by flowing the titrant dropwise from the generator to the mixing point. In another alternative form, the liquid, either the titrant or the mixture, could be released to run along a sloping, essentially nonwettable, insulating surface in drops. A tube or trough of polytetrafluoroethylene or similar material would be suitable for this purpose.

Of course, care should also be taken to eliminate any electrical path between liquid appearing at the electrode 25 of the generator and the measuring electrode. If, for example, the drain tab 46 on the electrode is in contact with a grounded drain pipe and liquid draining from electrode 25 is continuously grounded, undesirable signal feedback may occur. Accordingly, it is desirable in the presence of such grounded discharge means to have either or both streams from tab 46 and line 37 draining in a dropwise, self-insulating manner.

Figure 2:
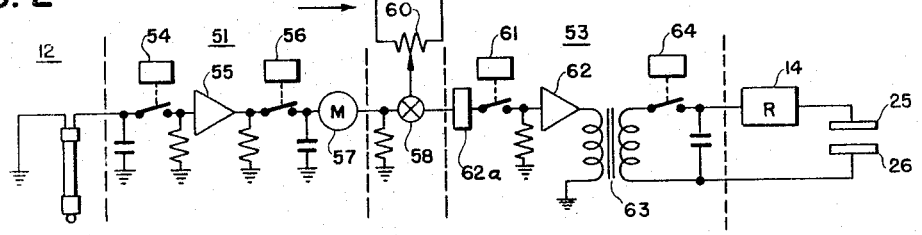
FIG. 2 is an electrical schematic of the electrical system of the apparatus of FIG. 1.

A preferred circuit for the amplifier-controller 13 is shown in FIG. 2 and includes a pH meter section 51, a reference control section 52, and a converter and amplifier section 53. The pH meter section 51 includes an input chopper 54, an A.C. amplifier 55, and an output chopper 56, the two choppers being operated in synchronism and ordinarily at the A.C. line frequency. The pH meter output may be indicated on a meter 57 and is bucked against a selected endpoint reference voltage at a mixing point 58, with the difference between the pH meter output and the reference voltage providing the input signal to the converter and amplifier section 53.

The reference voltage source may comprise a battery 59 with a potentiometer 60 connected thereacross, with the reference voltage appearing at the arm of the potentiometer. Shunting resistor 60a is grounded at a median point, serving to reference the voltage source with respect to ground and permits selection of positive and negative reference voltages. The reference voltage is adjusted to set the instrument to any desired titration endpoint condition, i.e., to a voltage value equal to that generated at the pH meter output by a mixture of chemically equivalent samples and titrant streams. Any difference between the pH meter signal and the preset endpoint value is the error signal, and this is applied to the ensuing power stage.

The converter and power amplifier section 53 preferably includes a functional converter 62a, an input chopper 61, an A.C. amplifier 62, an output transformer 63 and a synchronous rectifier 64, which in actual practice may be a chopper, a transistor switch, or the like.

In order to make the system operative as a servomechanism for high sample concentrations (0.1 normal or more), it has been found desirable to modify the amplifier transfer function (output current as a function of error signal). In these circumstances, a very wide range (equal to several decades) of unbalance concentration may exist in the sample-titrant, mixture to which the sensing electrode must respond. Specifically, it has been found desirable to perform an exponential conversion upon the error signal E such that hte output current control signal V varies as $V = e^{AE+B}$ where A and B are constants and are preferably adjustable to accommodate the response of the apparatus to the characteristics of various types of samples. This conversion operation is performed by converter 62a, which may be of the general form shown in FIG. 4.

The error signal E from subtractor 58 is divided down by the A-selector potentiometer 65 to give AE. To this signal is added a voltage B by adjustment of the B-selector potentiometer 66, this potentiometer being shunted by a voltage source such as battery 67. A diode 68, for example a germanium semiconductor type, is connected to the junction of potentiometer 66 and battery 67 and has the characteristic that current through the diode varies exponentially with the voltage across it. Hence, applying the voltage $AE+B$ across the diode, we obtain a current function of the form $I \propto e^{AE+B}$. This developes a corresponding voltage across resistor 69, giving a voltage signal $E_0$ to be applied to the output power stage 62.

The basis for the need of an exponential converter may be shown as follows: Assume an acid sample of "strong" (highly ionized) type, and for simplicity assume constant and equal volume flow rates for both titrant and sample. (The transformations required in the following discussion for the strong base case will be apparent to those skilled in the art.) Let S represent the instantaneous sample concentration in equivalents per liter and T the instantaneous titrant concentration. Assuming that at dynamic balance there is always a small excess of acid to provide the driving signal, the hydrogen ion concentration of the mixture is $(S-T)$. The potential difference $E_L$ of the electrode system at a given temperature will be of the form (1) $\qquad E_L = K \log_e (S-T) + C$ where K and C are constants dependent on the temperature, the particulars of the glass and reference electrode construction and the so-called "asymmetry" potential, if any, of the electrode system. If we now balance this electrode signal (in subtractor 58) against a fixed potential equal to that of the electrode system at the equivalence point, any unbalance represents an error signal E, differing from $E_L$ above only by a constant, whence we may write (2) $\qquad E = K \log_e (S-T) + D$ Assume now the error signal E is applied to an output current controller having some transfer function such that the input E and output current control signal V are related by a function $f_0$, i.e.

(3) $\qquad E = f_0(V)$

Assume as a simple case that the output control signal V is simply the output current $I_0$ that is fed to the coulometric generator cell, i.e.

(4) $\qquad E = f_0(I_0)$

At dynamic balance the titrant concentration is proportional to I, i.e.

(5) $\qquad T = PI$ where P is a proportionality factor. If the transconductance $dI_0/dE$ is high at all values of input signal in the operating range, then at dynamic balance, very nearly, $T = S$. Thus we obtain from the (4) and (5) as the steady state error signal (6) $\qquad E = f_0 \, S/P$ To derive the steady state "chemical" error $(S-T)_s$, i.e. the concentration departure of the sample-titrant mixture from equivalence, we note first from (2) that (7) $\qquad (S-T)_s = \exp \, [(E-D)/K]$ where exp [ ] denotes the natural log base $e$ raised to a power of the bracketed value. Combining (7) with (5) and (6) we have (8) $\qquad (S-T)_s = \exp \, [(1/K)f_0(S/P) - D]$ Noting in (8) that $S/P$ very nearly equals $T/P$, it may be seen that if the error signal is applied to a conventional linear amplifier (i.e. with transconductance $$G_m = dI_0/dE = \text{a constant})$$

the steady state chemical error varies exponentially with the instantaneous concentration T of generated reagent. This situation is not tolerable in the design of a servo system where S may be high as 0.1 N and where in consequence $(S-T)$ may, in the dynamic control region, range over several decades of values.

Equation 8 shows further that if $f_0$ is made a logarithmic function, then $(S-T)_s$ may be made linear with S, a desirable servo condition. Specifically if in (8) we make $f_0(S/P) = Z \log_e (S/P)$ where Z is a constant, we may write (9) $\qquad \log_e (S-T)_s = (1/K)(Z \log_e S/P) - D$ or

(10) $\qquad (S-T)_s = (S/P)^{Z/K}(E^{-D})$

If now we make $Z = K$, we have

(11) $\qquad (S-T)_s = e^{-D}(S/P)$

That is, we have linearized $(S-T)_s$ as a function of S (since D and P are constants).

The desirable output-input function expressed in (4) should therefore specifically be

(12) $\qquad E = K \log_e I_0$ or in the more conventional inverse form,

(13) $\qquad I_0 = e^{E/K}$

That is, we require an exponential conversion of the error signal E.

In the actual operation of the titrator, fluctuations occur in the titer of the sample-titrant mixture even when the sample concentration is constant and may be of the order of several tenths of a percent, the fluctuation magnitude being defined as $100(S-T)/S$. Such fluctuations are due in part to imperfect mixing and in part due to "hunting" of the equilibrium generator current value. Within this range of concentration error the equations given above for a "strong" type sample adequately represent the corresponding pH error.

In the titration of so-called "weak" or poorly ionized acids and bases, however, the shape of the titration curve and the relationship between concentration error and pH error (i.e. electrical signal error) is altered. Practice has shown that an adequate adjustment of the response of the apparatus may nevertheless be made in these cases by suitable modification of the exponential conversion function. In particular, the controller output value V governing the generator current may be of the general form $V = e^{AE+B}$, or where the output value is simply the generator current $I_0$ per se,

(14) $$I_0 = {^{AE+B}}$$

where A and B are adjustable for optimum response in the titration of various sample substances.

Change of A will change the slope of the transfer function as needed for the "very weak" sample of very low dissociation constant; B will compensate for a pH "bias" occurring in the case of the moderately "weak" sample. In the case of alkaline samples, the quantitative relationships are analogous, except that the sign of the error signal E will be reversed, and there will be required a corresponding reversal, without change of form, in the output characteristic of the amplifier. Finally, it will be apparent to those versed in the art that in oxidation-reduction titrations the shape of the titration curve may likewise be adequately compensated by suitable choice of A and B in (14) above.

Figure 4:
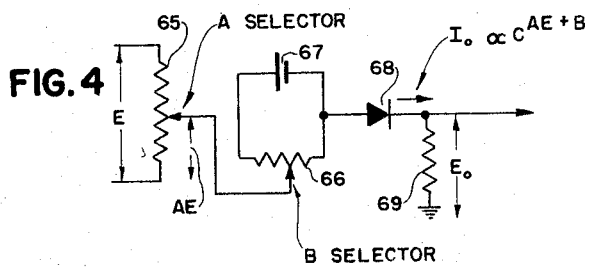
FIG. 4 illustrates an alternative arrangement for a portion of the apparatus of FIG. 1.

A form of circuit which provides the desired variable conversion is shown in FIG. 4 and has been described above.

The apparatus of the invention has very low volumetric holdup and hence very little delay in sensing changes in sample condition. This desirable mode of operation is achieved by mixing very small quantities of sample and titrant and providing a substantially complete change of sample-titrant mixing at the sensing electrode with each drop. In a preferred form of the apparatus, the volume of liquid contained in the mixing funnel is in the order or 0.3 to 0.4 ml. Mixing is produced by high velocity shearing action in the cylindrical film of liquid between the rotating rod 39 and the mixing funnel wall. In this particular embodiment, the mixture is dropped onto the electrode at a rate of about one drop per second. In order to prevent a film of the liquid mixture from creeping up the wall of the electrode and increasing the holdup volume, it is sometimes desirable to provide a nonwettable surface on the exterior of the electrode. This may be achieved by providing a sleeve or coating 66 of nonwettable material such as polytetrafluoroethylene on the electrode.

The utilization of dropwise flow of mixture to the electrode eliminates a need for special means to circulate the liquid over the electrode. Liquid flow to and from the electrode is provided entirely by gravity, and the shape of the liquid layer is determined by the capillary effect of the thin film following the electrode contour. No container is required for holding the mixture during the measuring process although, of course, a small container may be utilized where desired.

The pump 18 controls the flow of the sample, the supply of electrolyte, and the flow of the supplementary liquid when used. The pump is preferably of the peristaltic type which provides a continuous and controlled flow of liquid through all of the lines being pumped and which may be individually adjusted for each line by choice of peristaltic tubing diameter.

Figure 3:
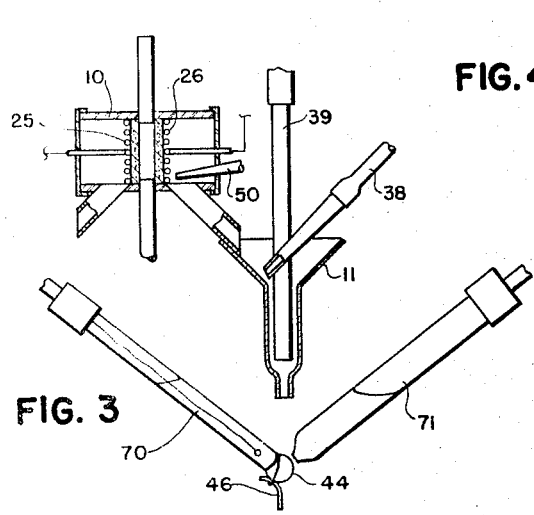
FIG. 3 is an electrical schematic of a converter suitable for use in the circuit of FIG. 2.

FIG. 3 shows an alternative form of the present invention, with components corresponding to those of the apparatus of FIG. 1 being identified by the same reference numerals. In the apparatus of FIG. 3, the supplementary liquid is delivered to the titrant at the lower edge of the electrode 26 where the titrant leaves the electrode, rather than flowing over the electrode as in the structure of FIG. 1.

Two separate electrodes are used in place of the combination sensing electrode of FIG. 1. A conventional glass electrode 70 is positioned below the funnel 11 for receiving the drops of sample-titrant mixture. A separate reference electrode 71 is positioned adjacent the sensitive bulb 44 of the glass electrode with the operating tip of the reference electrode close enough to the bulb to be contacted by the film of liquid on the bulb thereby forming a measuring system similar in operation to that shown in FIG. 1.

In addition to acid-base titrations, many other kinds of titrations may be conducted. For example, ferrous ion may be generated from an aqueous electrolyte comprising a solution of a ferric salt, this being useful in the titration of dichromate and other types of samples. Halogens such as iodone, bromine and chlorine may be generated from aqueous solutions of the corresponding halides and used in the titration of reducing type samples such as arsenite. Metallic indicating electrodes may be used in these oxidation-reduction titrations, and the endpoint sensing technique may be of potentiometric, amperometric or other types.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a continuous titrator, the combination of:
means for coulometrically generating a titrant;
means for mixing liquid sample and titrant to form a reaction product;
electrolytic means for sensing the ion concentration of said reaction product;
means for directing said reaction product from said mixing means to said sensing means;
and control means electrically coupled between said sensing means and said titrant supplying means for controlling the rate at which said titrant is generated, said control means having an exponential transfer function.

2. The apparatus of claim 1 wherein means are provided for recording the output of said control means.

3. In a continuous titrator, the combination of:
electrolytic means for generating a titration reagent;
means for admixing said reagent with a sample stream to produce a stream of reaction mixture;
electrolytic means for sensing departure of said mixture from an ion concentration equivalence point and generating an electrical signal as a function thereof;
means responsive to said signal for producing an output current signal as an exponential function thereof;
means for applying said output current signal to said reagent generating means, said signal being varied in a sense to modify the reagent generation rate to reduce said departure from equivalence to a minimum; and
means for recording said output current signal.

4. The apparatus of claim 3 wherein said output signal producing means has a transfer characteristic of the form $$I_0 = e^{AE+B}$$

where $I_0$ is the output current, E is the input voltage derived from the sensing means as a function of the departure from equivalence, A and B are constants, and $e$ is the natural log base.

5. The apparatus of claim 4 wherein A and B are adjustable for modifying titrator performance according to the titration characteristics of the sample.

6. The apparatus of claim 4 wherein the sensing means comprises a potentiometric electrode system generating a potential $E_L$ varying logarithmically with the departure $(S-T)$ from equivalence and having the form $$E_L = K \log_e (S-T) + C$$

where K and C are constants at a given operating temperature for a given electrode system, S represents the instantaneous sample concentration in equivalents per liter, and T represents the instantaneous titrant concentration.

7. A method of continuous titration comprising:
generating, by electrolysis, a titration reagent;
mixing said reagent with a sample stream to form a stream of reagent mixture;
mixing said reagent with a sample stream to form a stream of reagent mixture;
sensing electrolytically the ion concentration of said reagent mixture;
generating an electrical signal indicative of said concentration;
converting said electrical signal into a control signal having an exponential relationship with said electrical signal; and
controlling said generation of said titration reagent with said control signal.

8. In a continuous titrator, the combination of:
a coulometric reagent generator for providing a flow of liquid titrant by current flow through an electrolyte;
mixing means for mixing titrant and liquid sample to produce a liquid reaction product;
means for providing a flow of liquid sample to said mixing means;
electrolytic means for measuring the ion concentration of said reaction product, which concentration varies as a ratio of titrant to sample;
means including said mixing means providing flow communication between said generator and said measuring means, said flow communication means including means defining an air gap between said generator and said measuring means;
flow control means operatively associated with said generator for delivering discrete drops of liquid titrant from said generator through said air gap to said measuring means, whereby said generator and said measuring means are electrically isolated by air; and
current control means coupled between said generator and said measuring means for varying the current in said generator, and thereby the titrant output thereof, as an exponential function of the measured ion concentration of said reaction product to produce a particular ion concentration in said reaction product at said measuring means.

9. In a continuous titrator, the combination of:
a coulometric reagent generator for providing a flow of liquid titrant by current flow through an electrolyte;
mixing means for mixing titrant and liquid sample to produce a liquid reaction product;
means for providing a flow of liquid sample to said mixing means;
electrolytic means for measuring the ion concentration of said reaction product, which concentration varies a ratio of titrant to the sample;
means including said mixing means providing flow communication between said generator and said measuring means, said flow communication means including means defining an air gap between said mixing means and said measuring means;
flow control means operatively associated with said generator and said sample delivering means for delivering discrete drops of liquid reaction product from said mixing means through said air gap to said measuring means, whereby said generator and said measuring means are electrically isolated by air; and
current control means coupled between said generator and said measuring means for varying the current in said generator, and thereby the titrant output thereof, as an exponential function of the measured ion concentration of said reaction product to produce a particular ion concentration in said reaction product at said measuring means, said current control means providing conductive isolation therebetween.

10. In a continuous titrator, the combination of:
a coulometric reagent generator for providing a flow of liquid titrant by current flow through an electrolyte;
mixing means for mixing titrant and liquid sample to produce a liquid reaction product, said mixing means having an outlet for said reaction product;
means for providing a flow of liquid sample to said mixing means;
means for directing titrant from said generator to said mixing means;
electrolytic measuring means for measuring the ion concentration of said reaction product, which concentration varies as a function of the ratio of titrant to sample, said measuring means having a sensing portion spaced from said outlet of said mixing means and adapted to receive reaction product therefrom;
means for delivering discrete drops of said reaction product from said outlet of said mixing means to the sensing portion of said measuring means, whereby said generator and said measuring means are electrically isolated by air; and
current control means coupled between said generator and said measuring means for varying the current in said generator, and thereby the titrant output thereof, as an exponential function of the measured ion concentration of said reaction product to produce a particular ion concentration in said reaction product at said sensing portion of said measuring means, said current control means providing conductive isolation therebetween.

11. A method of continuous titration comprising:
providing a flow of liquid sample;
electrolytically generating a titration reagent;
mixing said reagent with the sample to produce a reaction product;
providing means for measuring electrolytically the ion concentration of said reaction product, which concentration varies as a function of the ratio of titrant to sample, said measuring means comprising a sensing electrode and a reference electrode, said sensing electrode having an ion-sensitive portion and said reference electrode having a liquid junction;
delivering discrete drops of said reaction product to said measuring means, said drops flowing over the outside of said ion-sensitive portion in a film, and said liquid junction contacting said film;
sensing said ion concentration of said reaction product with said measuring means;
generating an electrical signal indicative of said ion concentration; and
controlling the rate of generation of said reagent with said electrical signal.

12. In a continuous titrator, the combination of:
a mixer having an inlet and an outlet;
a coulometric reagent generator for continuously generating a titrant by electrical current flow through an electrolyte supplied to said generator, said generator having an electrolyte inlet and a titrant outlet, said outlet being positioned to deliver titrant to said mixer inlet;
means connected to said generator inlet for delivering a flow of electrolyte from a source of electrolyte to said generator, said electrolyte delivery means including means for controlling said electrolyte flow;

means coupled with said mixer inlet for delivering a flow of sample from a source of sample to said mixer inlet, said sample delivery means including means for controlling said sample flow, said mixer mixing said sample and titrant to produce a reaction product at said mixer outlet;

electrolytic means for receiving said reaction product and measuring the ion concentration of said reaction product which concentration varies as a ratio of titrant to sample, said electrolytic measuring means including highly wettable material in contact with the lower portion thereof for rapidly removing said reaction product from said measuring means to minimize reaction product holdup on said measuring means;

means for providing flow communication between said mixer outlet and said electrolytic measuring means, said flow communication means including means defining a gap between said mixer outlet and said electrolytic measuring means, said electrolytic flow control means and said sample flow control means being set to provide delivery of said reaction product in discrete drops from said mixer outlet, through said gap, to said electrolytic measuring means; and current control means coupling said electrolytic measuring means and said generator for varying the current in said generator and thereby the titrant output thereof as a function of the measured ion concentration of said reaction product to produce a particular ion concentration in said reaction product at said measuring means.

13. A combination, as defined in claim 12, in which:
an other gap is provided between said titrant outlet of said generator and said mixer inlet, said electrolyte flow control means being set to provide delivery of said titrant in discrete drops from said titrant outlet, through said other gap, to said mixer inlet.

14. A combination, as defined in claim 12, in which:
said current control means varies said current in said generator as an exponential function of said measured ion concentration.

15. In a continuous titrator, the combination of:
a mixer having an inlet and an outlet;
a coulometric reagent generator for continuously generating a liquid titrant by electrical current flow through an electrolyte supplied to said generator, said generator having an electrolyte inlet and a titrant outlet, said outlet being positioined to deliver titrant to said mixer inlet;

means connected to said generator inlet for delivering a flow of electrolyte from a source of electrolyte to said generator, said electrolyte delivery means including means for controlling said electrolyte flow;

means coupled with said mixer inlet for delivering a flow of sample from a source of liquid sample to said mixer inlet, said sample delivery means including means for controlling said sample flow, said mixer mixing said sample and titrant to produce a liquid reaction product at said mixer outlet;

electrolytic means for receiving said reaction product and measuring the ion concentration of said reaction product, which concentration varies at a ratio of titrant to sample, said electrolytic measuring means comprising a sensing electrode and a reference electrode, said sensing electrode having an ion-sensitive portion and said reference electrode having a liquid junction means positioned sufficiently close to said ion-sensitive portion so as to contact a film of reaction product formed on said ion-sensitive portion;

means for providing flow communication between said mixer outlet and said electrolytic measuring means, said flow communication means including means defining a gap between said mixer outlet and said electrolytic measuring means, said electrolyte flow control means and said sample flow control means being set to provide delivery of said reaction product in discrete drops from said mixer outlet, through said gap, to said electrolytic measuring means; and current control means coupling said electrolytic measuring means and said generator for varying the current in said generator and thereby the titrant output thereof as a function of the measured ion concentration of said reaction product to produce a particular ion concentration in said reaction product at said measuring means.

16. A combination, as defined in claim 15, in which:
an other gap is provided between said titrant outlet of said generator and said mixer inlet, said electrolyte flow control means being set to provide delivery of said titrant from said titrant outlet, through said other gap, to said mixer inlet, in discrete drops.

17. A combination, as defined in claim 15, in which:
said current control means varies said current in said generator as an exponential function of said measured ion concentration.

18. In a continuous titrator, the combination of:
a mixer having an inlet and an outlet;
a coulometric reagent generator for continuously generating a titrant by electrical current flow through an electrolyte supplied to said generator, said generator having an electrolyte inlet and a titrant outlet, said outlet being positioned to deliver titrant to said mixer inlet;

means disposed between said titrant outlet and said mixer inlet for providing flow communication between said titrant outlet and said mixer inlet, said flow communication means including means defining a gap between said titrant outlet and said mixer inlet;

means connected to said generator inlet for delivering a flow of electrolyte from a source of electrolyte to said generator, said electrolyte delivery means including means for controlling said electrolyte flow, said flow control means being set to provide delivery of said titrant in discrete drops from said titrant outlet, through said gap, to said mixer inlet;

means coupled with said mixer inlet for delivering a flow of sample from a source of sample to said mixer inlet, said mixer mixing said sample and titrant to produce a reaction product at said mixer outlet;

electrolytic means positioned relative to said mixer outlet for receiving said reaction product and measuring the ion concentration of said reaction product, which concentration varies as a ratio of titrant to sample, said electrolytic measuring means comprising a sensing electrode and a reference electrode, said sensing electrode having an ion-sensitive portion and said reference electrode having a liquid junction means positioned sufficiently close to said ion-sensitive portion so as to contact a film of reaction product formed on said ion-sensitive portion; and current control means coupling said electrolytic measuring means and said generator for varying the current in said generator and thereby the titrant output thereof as a function of the measured ion concentration of said reaction product to produce a particular ion concentration in said reaction product at said measuring means.

19. A combination, as defined in claim 18, in which:
said current control means varies said current in said generator as an exponential function of said measured ion concentration.

20. A titrator as defined in claim 12 in which said measuring means further includes an electrometric electrode system which generates a D.C. signal as a function of said ion concentration in said liquid reaction product, and in which the current control means includes modulating means for deriving an A.C. signal from said D.C. signal, transformer means having isolated primary and secondary windings, means for applying said A.C. signal to said primary winding, means for rectifying the secondary winding output, and means for applying the rectified output to said generator.

References Cited by the Examiner

UNITED STATES PATENTS

| | | | |
|---|---|---|---|
| 2,108,294 | 2/1938 | Doyle et al. | 204—195 |
| 2,744,061 | 5/1956 | De Ford et al. | 204—195 |
| 2,758,079 | 8/1956 | Eckfeldt | 204—195 |
| 2,832,734 | 4/1958 | Eckfeldt | 204—195 |
| 2,993,846 | 7/1961 | Tyler | 204—195 |

FOREIGN PATENTS 643,624   3/1937   Germany.

JOHN H. MACK, *Primary Examiner.*

JOHN R. SPECK, MURRAY TILLMAN, WINSTON A. DOUGLAS, *Examiners.*

T. TUNG, *Assistant Examiner.*